(12) United States Patent
Nies et al.

(10) Patent No.: US 8,267,653 B2
(45) Date of Patent: Sep. 18, 2012

(54) SYSTEM AND METHOD OF OPERATING AN ACTIVE FLOW CONTROL SYSTEM TO MANIPULATE A BOUNDARY LAYER ACROSS A ROTOR BLADE OF A WIND TURBINE

(75) Inventors: Jacob Johannes Nies, Zwolle (NL); Wouter Haans, Den Haag (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/975,014

(22) Filed: Dec. 21, 2010

(65) Prior Publication Data
US 2011/0206506 A1 Aug. 25, 2011

(51) Int. Cl.
*F03D 7/00* (2006.01)
(52) U.S. Cl. ............. 416/1; 416/41; 416/91; 416/231 B; 416/236 R; 415/1; 415/914
(58) Field of Classification Search ................. 416/1, 41, 416/91, 231 R, 231 B, 236 R; 415/1, 914
See application file for complete search history.

(56) References Cited

U.S. PATENT DOCUMENTS

| | | | | |
|---|---|---|---|---|
| 2,156,133 | A * | 4/1939 | Troller | 416/91 |
| 3,005,496 | A * | 10/1961 | Nichols | 416/41 |
| 3,109,499 | A * | 11/1963 | Klein | 416/91 |
| 4,045,146 | A * | 8/1977 | Crimi | 416/1 |
| 4,692,095 | A | 9/1987 | Lawson-Tancred | |
| 4,726,548 | A * | 2/1988 | Clites | 244/209 |
| 5,938,404 | A | 8/1999 | Domzalski et al. | |
| 6,203,269 | B1 * | 3/2001 | Lorber et al. | 415/115 |
| 6,629,674 | B1 | 10/2003 | Saddoughi et al. | |
| 6,751,530 | B2 | 6/2004 | Seifert et al. | |
| 6,866,234 | B1 | 3/2005 | Hassan et al. | |
| 6,899,302 | B1 | 5/2005 | Hassan et al. | |
| 6,940,185 | B2 | 9/2005 | Andersen et al. | |
| 6,972,498 | B2 | 12/2005 | Jamieson et al. | |
| 7,104,143 | B1 | 9/2006 | Powell | |
| 7,134,631 | B2 | 11/2006 | Loth | |

(Continued)

FOREIGN PATENT DOCUMENTS

EP 1517033 A1 3/2005

(Continued)

OTHER PUBLICATIONS

David F. Fisher & Michael C. Fischer, Development Flight Tests of Jetstar LFC Leading-Edge Flight Test Experiment, (NASA, Langley Research Center ed., 1987).

(Continued)

*Primary Examiner* — Igor Kershteyn
(74) *Attorney, Agent, or Firm* — James McGinness, Esq.; Armstrong Teasdale LLP (57) ABSTRACT

An active flow control system for manipulating a boundary layer of air across a wind turbine rotor blade. The wind turbine rotor blade has at least one sidewall defining a cavity therein. The sidewall extends between a leading edge and an axially spaced trailing edge. The active flow control system includes an air discharge assembly that is coupled to the sidewall. The air discharge assembly is configured to selectively discharge air from within the wind turbine rotor blade into the boundary layer. An air suction assembly is coupled to the sidewall and to the air discharge assembly. The air suction assembly is configured to channel air from the boundary layer to the air discharge assembly.

18 Claims, 7 Drawing Sheets

U.S. PATENT DOCUMENTS

| | | | |
|---|---|---|---|
| 7,234,921 B2 * | 6/2007 | Shchukin et al. | 416/1 |
| 7,246,529 B1 | 7/2007 | Powell | |
| 7,305,893 B2 | 12/2007 | Powell et al. | |
| 7,354,247 B2 | 4/2008 | Bonnet | |
| 7,363,808 B2 | 4/2008 | Ormel et al. | |
| 7,387,491 B2 | 6/2008 | Saddoughi et al. | |
| 7,420,289 B2 | 9/2008 | Wang et al. | |
| 7,520,722 B2 * | 4/2009 | Schukin et al. | 416/1 |
| 7,582,977 B1 | 9/2009 | Dehlsen | |
| 8,016,560 B2 * | 9/2011 | McGrath et al. | 416/91 |
| 2005/0042102 A1 | 2/2005 | Teichert | |
| 2005/0242233 A1 | 11/2005 | Battisti | |
| 2007/0231151 A1 | 10/2007 | Herr et al. | |
| 2010/0135790 A1 | 6/2010 | Pal et al. | |

FOREIGN PATENT DOCUMENTS

| | | |
|---|---|---|
| GB | 2186033 A | 8/1987 |
| GB | 2466433 A | 6/2010 |
| WO | 2004092577 A1 | 10/2004 |
| WO | 2008080407 A1 | 7/2008 |

OTHER PUBLICATIONS

Gustave P. Corten & Herman F. Veldkamp, "Insects Can Halve Wind-Turbine Power," 412 Nature, 42-43 (2001).

Albert L. Braslow, "A History of Suction-Type Laminar-Flow Control with Emphasis on Flight Research," Monographs in Aerospace History, No. 13, pp. 20, 21, 24 (1999).

Hal Romanowitz, "Alternate Systems Engineering," available at www.oakcreekenergy.com/reports/flash/GCI-20020401.html (last visited Mar. 2, 2009).

Office Action dated Oct. 5, 2010, U.S. Appl. No. 12/613,170, 21 pages.

Office Action dated Aug. 19, 2010, U.S. Appl. No. 12/613,274, 17 pages.

* cited by examiner

SYSTEM AND METHOD OF OPERATING AN ACTIVE FLOW CONTROL SYSTEM TO MANIPULATE A BOUNDARY LAYER ACROSS A ROTOR BLADE OF A WIND TURBINE

BACKGROUND OF THE INVENTION

The subject matter described herein relate generally to methods and systems for operating an active flow control system to manipulate a boundary layer across a rotor blade of a wind turbine.

At least some known wind turbines include a nacelle fixed atop a tower, wherein the nacelle includes a rotor coupled to a generator through a shaft. In known rotor assemblies, a plurality of blades extend from the rotor. The blades are oriented such that wind passing over the blades turns the rotor and rotates the shaft, thereby driving the generator to generate electricity. As wind flows over an outer surface of the rotor blade, a boundary layer is formed over the outer surface that facilitates generating lift across the rotor blade.

At least some known wind turbine rotor blades include an active flow control system. Active Flow Control (AFC) is a general term for technologies and/or systems that actively attempt to influence an aerodynamic response of an object in reaction to given in-flow conditions. More specifically, at least some known AFC systems are used to manipulate the boundary layer across a wind turbine rotor blade. At least some known AFC systems use air distribution systems to discharge air from the rotor blade and into the boundary layer. Known AFC systems require air to be channeled from the nacelle and/or the hub to the rotor blade. By channeling air from the nacelle and/or the hub, known AFC systems increase the energy requirements of wind turbine components, which results in a reduction in annual energy production of the wind turbine.

BRIEF DESCRIPTION OF THE INVENTION

In one aspect, an active flow control system for manipulating a boundary layer of air across a wind turbine rotor blade is provided. The wind turbine rotor blade has at least one sidewall defining a cavity therein. The sidewall extends between a leading edge and an axially spaced trailing edge. The active flow control system includes an air discharge assembly that is coupled to the sidewall. The air discharge assembly is configured to selectively discharge air from within the wind turbine rotor blade into the boundary layer. An air suction assembly is coupled to the sidewall and to the air discharge assembly. The air suction assembly is configured to channel air from the boundary layer to the air discharge assembly.

In another aspect, a wind turbine is provided. The wind turbine includes a tower, a nacelle that is coupled to the tower, and a hub that is rotatably coupled to the nacelle. The hub defines a cavity. At least one rotor blade is coupled to the hub. The rotor blade includes at least one sidewall that defines a cavity. The sidewall has an outer surface that extends between a leading edge and an axially-spaced trailing edge of the rotor blade. An active flow control system is coupled to the rotor blade for manipulating a boundary layer of air across the outer surface. The active flow control system includes an air discharge assembly that is coupled to the sidewall. The air discharge assembly is configured to selectively discharge air from the wind turbine rotor blade into the boundary layer. An air suction assembly is coupled to the sidewall and to the air discharge assembly. The air suction assembly is configured to channel air from the boundary layer to the air discharge assembly.

In yet another aspect, a method of manipulating a boundary layer across a wind turbine rotor blade is provided. The method includes coupling an active flow control system to the rotor blade. The active flow control system includes an air suction assembly and an air discharge assembly. Each of the air suction assembly and the air discharge assembly are in flow communication with the boundary layer. Te air suction assembly is operated to channel air from the boundary layer to the air discharge assembly. The air discharge assembly is operated to discharge air from the air suction assembly into the boundary layer.

DETAILED DESCRIPTION OF THE INVENTION

The embodiments described herein facilitate assembling a rotor blade that increases an annual energy production of a wind turbine. As used herein, the term "annual energy production" refers to the cumulative electrical energy produced by a wind turbine during a period of a year. More specifically, the rotor blade described herein includes an active flow control system that selectively discharges air into a boundary layer flowing across a rotor blade outer surface. Moreover, the active flow control assembly described herein is configured to draw air from the boundary layer and to selectively discharge air into the boundary layer. By drawing air from the boundary layer and discharging air into the boundary layer, the active flow control system reduces a power requirement to manipulate the boundary layer to enable reattachment of the boundary layer and development of a laminar flow is developed adjacent the rotor blade outer surface. In addition the active flow control assembly selectively discharges air into the boundary layer to enhance aerodynamic properties of the rotor blade.

Figure 1:
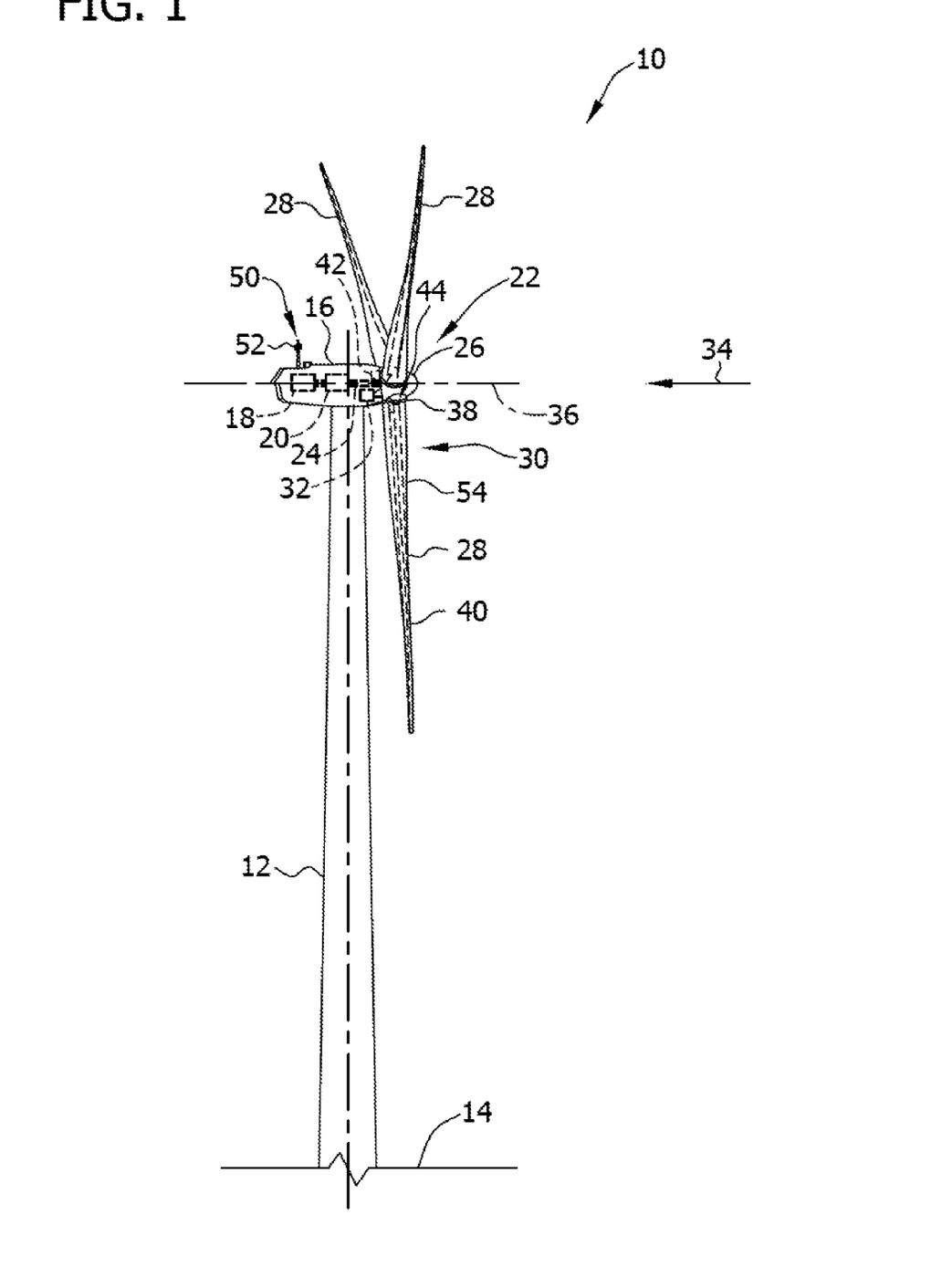
FIG. 1 is a perspective view of a portion of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a supporting surface 14, a nacelle 16 mounted on tower 12, a generator 18 positioned within nacelle 16, and a gearbox 20 that is coupled to generator 18. A rotor 22 is rotatably coupled to gearbox 20 with a rotor shaft 24. Alternatively, wind turbine 10 does not include gearbox 20 such that rotor 22 is rotatably coupled to generator 18 with rotor shaft 24. In the exemplary embodiment, rotor 22 includes a rotatable hub 26 and at least one rotor blade 28 that extends outwardly from hub 26. An AFC system 30 is coupled to rotor blade 28 to facilitate increasing energy production of wind turbine 10. An operational control system 32 is coupled to active flow control (AFC) system 30 and is in operational control communication with AFC system 30. As used herein, "operational control communication" refers to a link, such as a conductor, a wire, and/or a data link, between two or more components of wind turbine 10 that enables signals, electric currents, and/or commands to be communicated between the two or more components. The link is configured to enable one component to control an operation of another component of wind turbine 10 using the communicated signals, electric currents, and/or commands.

In the exemplary embodiment, rotor 22 includes three rotor blades 28. In an alternative embodiment, rotor 22 includes more or less than three rotor blades 28. Rotor blades 28 are spaced about hub 26 to facilitate rotating rotor 22 to enable kinetic energy to be transferred from the wind into usable mechanical energy, and subsequently, electrical energy. In the exemplary embodiment, rotor blades 28 have a length ranging from about 30 meters (m) (99 feet (ft)) to about 120 m (394 ft). Alternatively, rotor blades 28 may have any suitable length that enables wind turbine 10 to function as described herein. For example, other non-limiting examples of blade lengths include 10 m or less, 20 m, and 37 m, or a length that is greater than 120 m. As wind strikes rotor blades 28 from a direction 34, rotor 22 is rotated about an axis of rotation 36. As rotor blades 28 are rotated and subjected to centrifugal forces, rotor blades 28 are also subjected to various forces and moments. As such, rotor blades 28 may deflect and/or rotate from a neutral, or non-deflected, position to a deflected position. A pitch adjustment system 38 rotates rotor blades 28 about a pitch axis 40 for adjusting an orientation of rotor blades 28 with respect to direction 34 and/or a velocity of the wind. A speed of rotation of rotor 22 may be controlled by adjusting the orientation of at least one rotor blade 28 relative to wind vectors. Wind turbine 10 includes at least one velocity sensor 42 for transmitting a signal indicative of a speed of rotation of rotor 22 to operational control system 32. In the exemplary embodiment, an angle of attack or pitch of each rotor blade 28 is controlled individually by a pitch adjustment system 38 to adjust a speed of rotation of rotor 22. Pitch adjustment system 38 includes a sensor 44 for transmitting a signal indicative of an angle of attack of rotor blade 28 to operational control system 32. As used herein, the term "angle of attack" refers to the orientation of a chordwise axis 46 (shown in FIG. 3) of rotor blade 28 relative to a wind inflow direction 48 (shown in FIG. 3). Alternatively, the blade pitch for all rotor blades 28 may be controlled simultaneously by pitch adjustment system 38. Further, in the exemplary embodiment, nacelle 16 includes at least one meteorological mast 50 that includes a wind vane and a sensor 52 such as an anemometer. Sensor 52 is configured to sense a wind direction and/or a wind velocity of wind and transmit a signal indicative of wind direction 34 and/or the wind velocity to operational control system 32.

Figure 2:
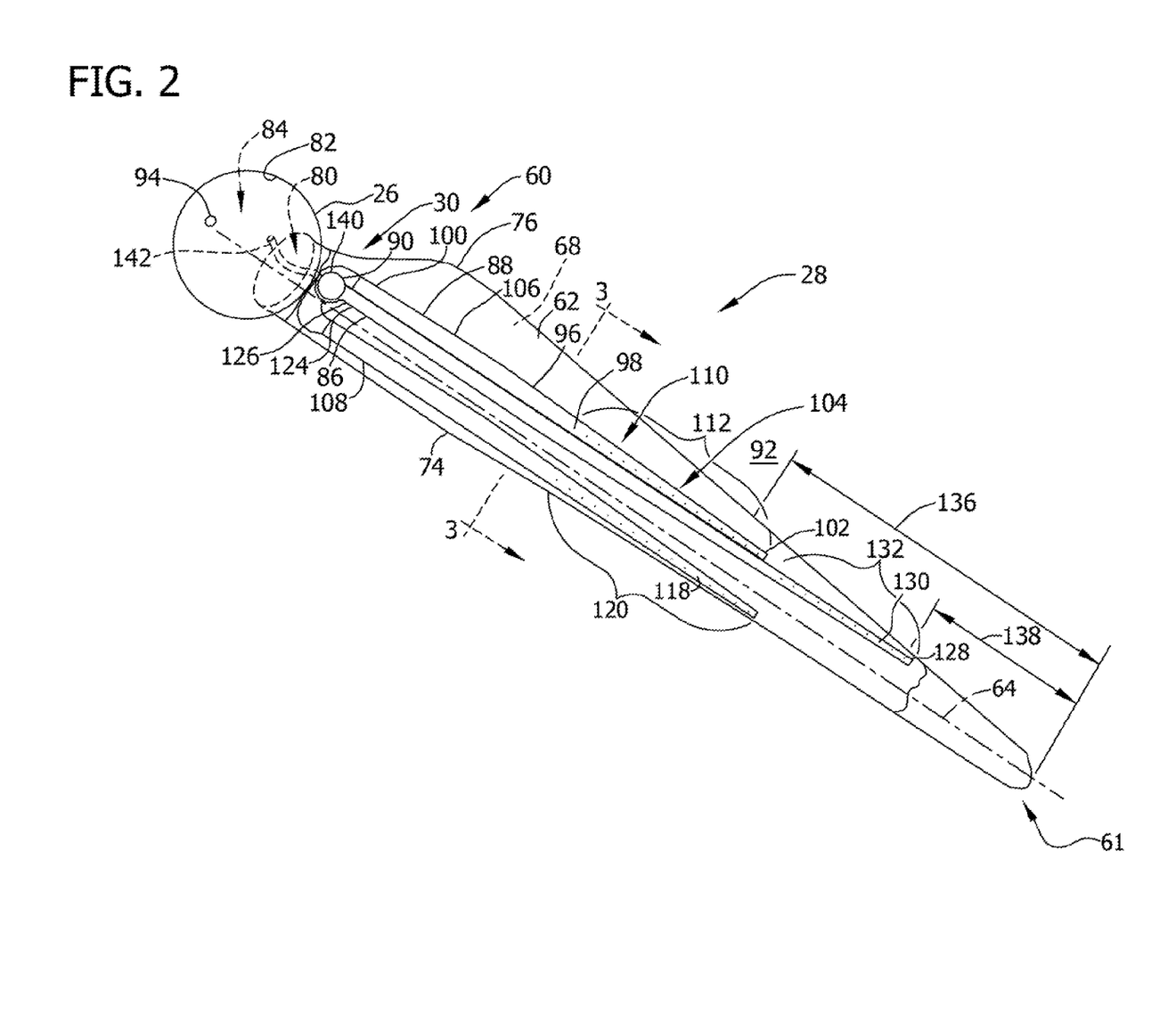
FIG. 2 is a perspective view of an interior of an exemplary rotor blade suitable for use with the wind turbine shown in FIG. 1 that includes an exemplary active flow control system.
Figure 3:
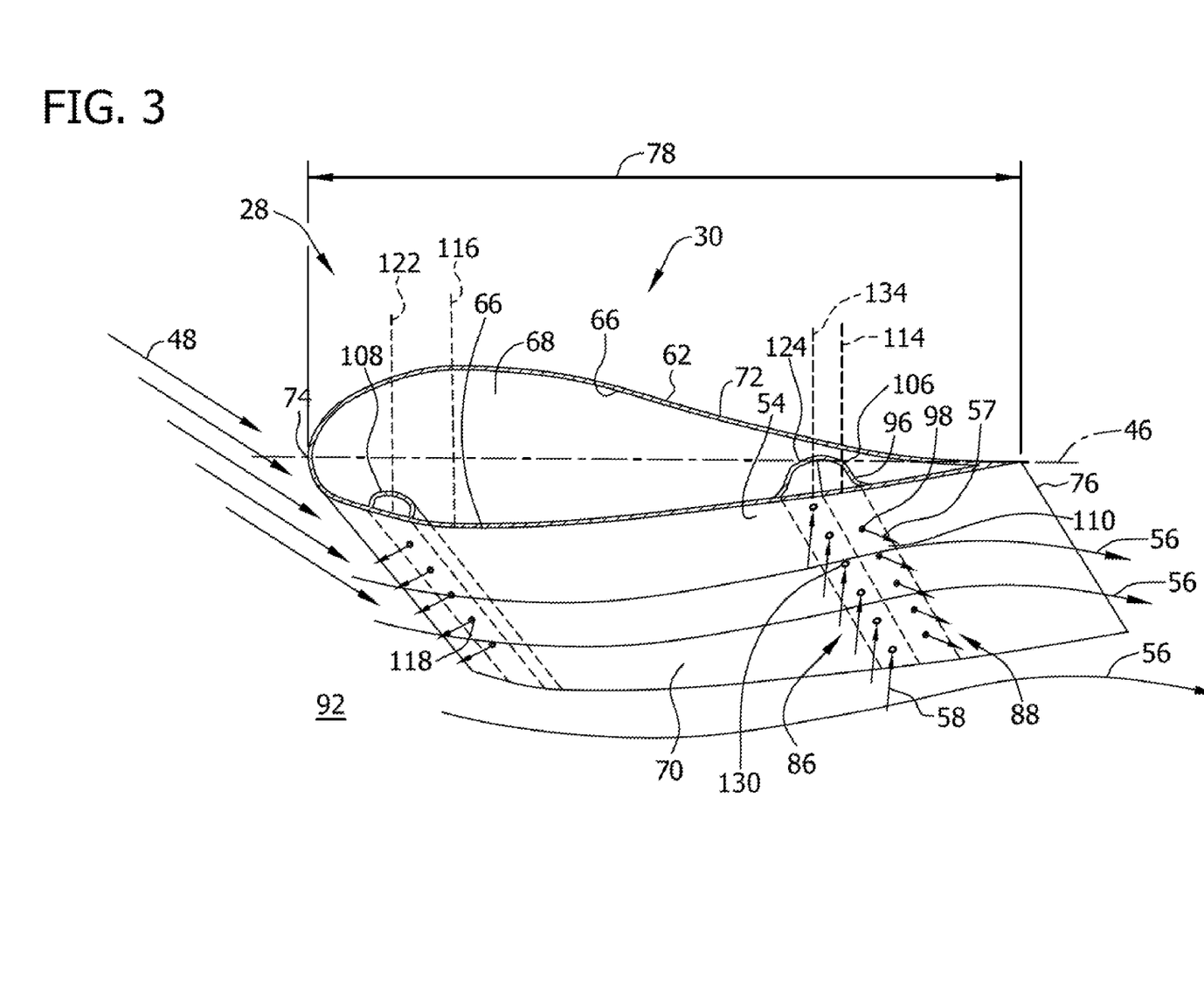
FIG. 3 is a cross-sectional view of the exemplary rotor blade including the active flow control system shown in FIG. 2 along sectional line 3-3.

FIG. 2 is a perspective view of an exemplary rotor blade 28. FIG. 3 is a cross-sectional view of rotor blade 28 at a chordwise sectional line 3-3 in FIG. 2. Identical components shown in FIG. 3 are identified with the same reference numbers used in FIG. 2. During operation of wind turbine 10, wind is channeled over an outer surface 54 of rotor blade 28 and forms a boundary layer that extends between a boundary plane, represented by arrow 56, and outer surface 54. As a velocity of wind increases across rotor blade 28, boundary layer 56 may separate from outer surface 54. In the exemplary embodiment, AFC system 30 is configured to discharge air from within rotor blade 28 into boundary layer 56 to facilitate manipulating boundary layer 56. More specifically, in the exemplary embodiment, as boundary layer 56 begins to separate from outer surface 54, operational control system 32 operates AFC system 30 to discharge air, represented by arrows 57, into boundary layer 56 to prevent separation of boundary layer 56 from to outer surface 54 and to increase the lift across rotor blade 28, which increases the power generated by wind turbine 10. Additionally, operational control system 32 operates AFC system 30 to draw in air, represented by arrows 58, from boundary layer 56 to further manipulate boundary layer 56 to increase the lift across rotor blade 28. Alternatively, operational control system 32 may operate AFC system 30 to discharge air upstream of boundary layer 56 to manipulate boundary layer 56 to decrease the lift across rotor blade 28.

In the exemplary embodiment, rotor blade 28 includes a first or root portion 60 and a second or tip portion 61 opposing root portion 60. Root portion 60 is configured to facilitate mounting rotor blade 28 to hub 26. A blade sidewall 62 of rotor blade 28 extends between root portion 60 and tip portion 61 and along a longitudinal spanwise axis 64. Blade sidewall 62 has an inner surface 66 that at least partially defines a blade cavity 68 that extends from root portion 60 towards tip portion 61. In the exemplary embodiment, blade sidewall 62 includes a first blade section 70, such as a suction side blade section, and an opposing second blade section 72, such as a pressure side blade section. In this embodiment, first blade section 70 is coupled to second blade section 72 along a leading edge 74 and an axially-spaced trailing edge 76. Rotor blade 28 has a chordwise width 78 extending along chordwise axis 46 that is defined between leading edge 74 and trailing edge 76.

In the exemplary embodiment, first blade section 70 and second blade section 72 are coupled together to form an opening 80 at root portion 60. Hub 26 includes an inner surface 82 that defines a hub cavity 84. Rotor blade 28 is coupled to hub 26 at root portion 60 such that opening 80 provides flow communication between hub cavity 84 and rotor blade cavity 68.

In the exemplary embodiment, AFC system 30 includes an air suction assembly 86, an air discharge assembly 88, and a flow control assembly 90. Air suction assembly 86 is coupled to rotor blade 28 and to air discharge assembly 88 for channeling a flow of air from boundary layer 56 to air discharge assembly 88. More specifically, in the exemplary embodiment, air suction assembly 86 is configured to draw in ambient air 92 from boundary layer 56 and at least partially channel air to air discharge assembly 88. Air discharge assembly 88 is coupled to rotor blade 28 and is configured to discharge air from air suction assembly 86 into boundary layer 56 to manipulate boundary layer 56. In the exemplary embodiment, flow control assembly 90 is coupled between air suction assembly 86 and air discharge assembly 88 for selectively channeling air from air suction assembly 86 to air discharge assembly 88. Flow control assembly 90 is further coupled to hub 26 for selectively channeling air from air suction assembly 86 to hub cavity 84, and for selectively channeling air from hub cavity 84 to air discharge assembly 88. In one embodiment, hub 26 forms an opening 94 that provides flow communication between ambient air 92 and flow control assembly 90. In this embodiment, flow control assembly 90 is further configured to channel a flow of air from ambient air 92, through hub cavity 84 and to air discharge assembly 88. In the exemplary embodiment, flow control assembly 90 is positioned within rotor blade cavity 68. Alternatively, flow control assembly 90 may be positioned within hub cavity 84

In the exemplary embodiment, air discharge assembly 88 includes at least one discharge manifold 96 that is positioned within respective rotor blade cavity 68 and is coupled to inner surface 66. One or more discharge apertures 98 extend through sidewall 62 and into discharge manifold 96 to provide flow communication between discharge manifold 96 and ambient air 92. Discharge manifold 96 has a first end 100 and a second end 102 opposing first end 100. First end 100 is positioned within blade cavity 68 at root portion 60 and is coupled to air suction assembly 86 and/or to flow control assembly 90. Second end 102 is positioned within blade cavity 68 and is closer to tip portion 61 than first end 100. In the exemplary embodiment, discharge apertures 98 are aligned in a single row 104 that extends generally along spanwise axis 64 of respective rotor blade 28. Alternatively, discharge apertures 98 may be aligned in any suitable array, in a single row, or in multiple rows at any suitable location along the length of rotor blade 28 that enables air discharge assembly 88 to function as described herein.

In the exemplary embodiment, air discharge assembly 88 includes a first discharge manifold 106 and a second discharge manifold 108. Flow control assembly 90 is coupled to first discharge manifold 106 and second discharge manifold 108 to selectively channel a flow of air from air suction assembly 86 and/or hub 26 to first discharge manifold 106 and second discharge manifold 108. One or more first discharge apertures 110 extend through sidewall 62 and into first discharge manifold 106 to provide flow communication between first discharge manifold 106 and ambient air 92. In the exemplary embodiment, first discharge apertures 110 are aligned in a row 112 along spanwise axis 64. Referring further to FIG. 3, row 112 is defined at a chordwise location 114 along chordwise axis 46 that is between a chordwise location 116 of maximum airfoil thickness of rotor blade 28 and trailing edge 76. Alternatively, chordwise location 114 of first discharge apertures 110 may be adjacent trailing edge 76. In the exemplary embodiment, one or more second discharge apertures 118 extend through sidewall 62 and into second discharge manifold 108 to provide flow communication between second discharge manifold 108 and ambient air 92. Second discharge apertures 118 are aligned in a row 120 along spanwise axis 64 that is defined at a chordwise location 122 between maximum chordwise airfoil thickness 116 and leading edge 74. First discharge apertures 110 are sized, shaped, and oriented to discharge air from first discharge manifold 106 into boundary layer 56 to manipulate boundary layer 56 and increase a lift of rotor blade 28. Second discharge apertures 118 are sized, shaped, and oriented to discharge air from second discharge manifold 108 into boundary layer 56 to decrease a lift of rotor blade 28.

In the exemplary embodiment, air suction assembly 86 is coupled to each rotor blade 28 to draw in ambient air 92 from boundary layer 56 and channel air to flow control assembly 90 and/or air discharge assembly 88. Air suction assembly 86 includes at least one suction manifold 124 that is positioned within respective rotor blade cavity 68 and is coupled to inner surface 66. Suction manifold 124 has a first end 126 and an opposing second end 128. First end 126 is positioned at root portion 60 and is coupled to first end 100 of discharge manifold 96 and flow control assembly 90. Second end 128 is positioned closer to tip portion 61 than first end 126. In the exemplary embodiment, one or more suction apertures 130 extend through sidewall 62 and into suction manifold 124 to provide flow communication between suction manifold 124 and ambient air 92. Suction apertures 130 are sized, shaped, and oriented to channel air from ambient air 92 to suction manifold 124. Suction apertures 130 are aligned axially in a single row 132 that extends generally along spanwise axis 64 of respective rotor blade 28. Alternatively, suction apertures 130 are aligned in any suitable array, in a single row, or in multiple rows at any suitable location along the length of rotor blade 28 that enables air suction assembly 86 to function as described herein. In one embodiment, suction apertures 130 and discharge apertures 110 and 118 are oriented in alternating rows along spanwise axis 64. Referring again to FIG. 2 and FIG. 3, in the exemplary embodiment, row 132 is defined at along chordwise axis 46 at chordwise location 134 that is between maximum chordwise airfoil thickness 116 and leading edge 74.

In the exemplary embodiment, row 112 of discharge apertures 98 is defined along spanwise axis 64 at a first spanwise distance 136 from tip portion 61. Row 132 of suction apertures 130 is defined along spanwise axis 64 at a second spanwise distance 138 from tip portion 61 that is less than first spanwise distance 136. In one embodiment, first spanwise distance 136 and second spanwise distance 138 are approximately equal. In a further embodiment, suction apertures 130 are defined with respect to discharge apertures 98 such that a portion of suction aperture row 132 overlaps discharge aperture row 112 with respect to spanwise axis 64.

In the exemplary embodiment, flow control assembly 90 is coupled between air suction assembly 86 and air discharge assembly 88 for selectively channeling air from air suction assembly 86 to air discharge assembly 88. Flow control assembly 90 is positioned adjacent root portion 60 and is coupled to first end 126 of air suction manifold 124 and first end 100 of discharge manifold 96. In one embodiment, flow control assembly 90 is further coupled to hub 26 for channeling air between air suction assembly 86, air discharge assembly 88, and hub cavity 84. In the exemplary embodiment, flow control assembly 90 includes a flow control device 140 coupled to a conduit 142. Flow control device 140 is further coupled to air suction assembly 86 and air discharge assembly 88. Flow control device 140 is, for example, a pump, a compressor, a fan, a blower, and/or any other suitable device for controlling a flow of air. Conduit 142 is coupled to hub inner surface 82 to provide flow communication between hub cavity 84 and flow control assembly 90.

Figure 4:
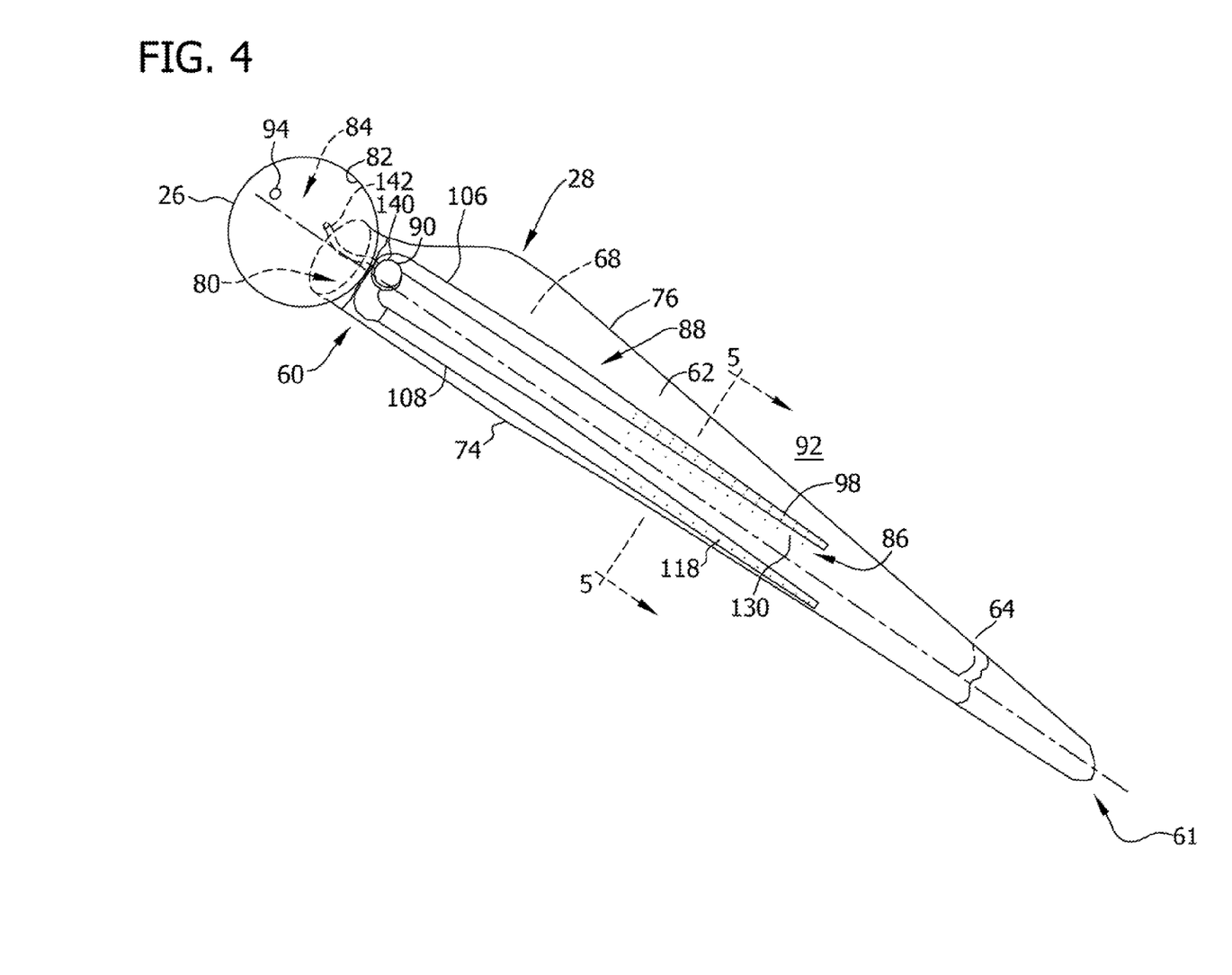
FIG. 4 is a perspective view of the rotor blade shown in FIG. 2 that includes an alternative active flow control system.
Figure 5:
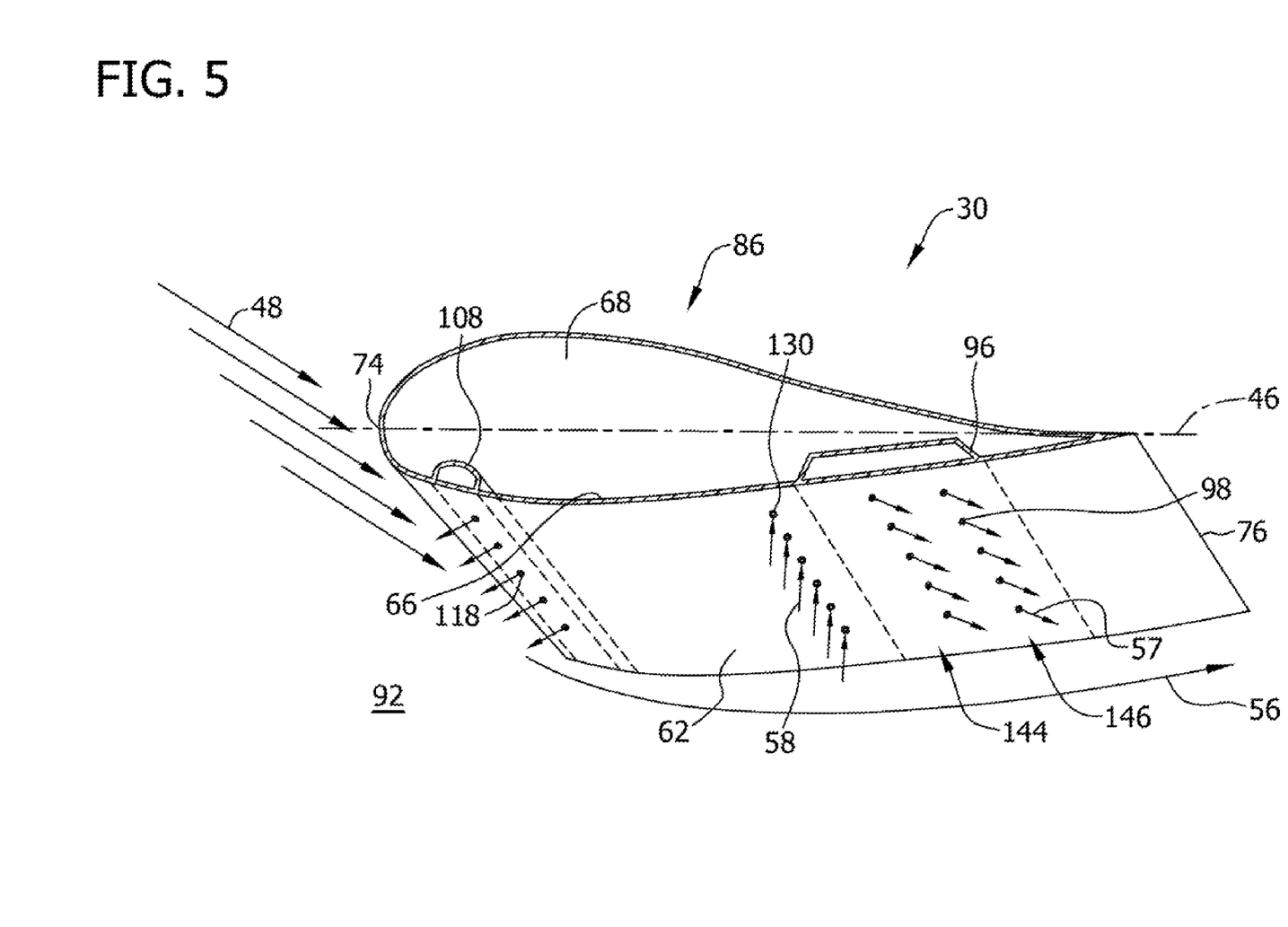
FIG. 5 is a cross-sectional view of an alternative active flow control system in FIG. 4 along sectional line 5-5.

FIG. 4 is a perspective view of rotor blade 28 that includes an alternative embodiment of AFC system 30. FIG. 5 is a cross-sectional view of an alternative embodiment of AFC system 30 at a chordwise sectional line 5-5 in FIG. 4. Identical components shown in FIG. 4 and FIG. 5 are identified with the same reference numbers used in FIG. 2 and FIG. 3. In this embodiment, air suction assembly 86 does not include air suction manifold 124. Suction apertures 130 extend through sidewall 62 and are sized, shaped, and oriented to draw air from boundary layer 56 into rotor blade cavity 68. First discharge apertures 110 include a first row 144 and a second row 146 that are each substantially oriented along spanwise axis 64. Second row 146 is positioned closer to trailing edge 76 than first row 144. Flow control assembly 90 is configured to channel air from rotor blade cavity 68 to air discharge assembly 88 and/or hub cavity 84.

In the exemplary embodiment, AFC system 30 is configured to selectively operate between a first or lift increasing mode, and a second or lift decreasing mode. As used herein, the term "lift increasing mode" refers to a mode of operation in which flow control assembly 90 channels at least a portion of air from air suction assembly 86 to air discharge assembly 88 to manipulate boundary layer 56 to adjust a lift and/or a drag to facilitate increasing the lift across rotor blade 28. As used herein, the term "lift decreasing mode" refers to a mode of operation in which flow control assembly 90 channels at least a portion of air from air suction assembly 86 to air discharge assembly 88 to adjust a lift and/or a drag facilitate reducing the lift across rotor blade 28. During operation of AFC system 30 in lift increasing mode, suction apertures 130 draw air into suction manifold 124 that channels air to flow control assembly 90. Flow control assembly 90 selectively channels at least a portion of air from air suction assembly 86 and hub 26 to first discharge manifold 106. First discharge manifold 106 channels air through first discharge apertures 110 and into boundary layer 56 to manipulate boundary layer 56 to increase lift of rotor blade 28. During operation of AFC system 30 in lift decreasing mode, air suction assembly 86 draws air from boundary layer 56 and channels air to flow control assembly 90. Flow control assembly 90 selectively channels air from air suction assembly 86 and hub 26 to second discharge manifold 108. Second discharge manifold 108 channels air through second discharge apertures 118 to ambient air 92 to facilitate decreasing a lift across rotor blade 28 to reduce rotation of rotor 22.

In the exemplary embodiment, flow control assembly 90 is configured to operate in a first air supply mode, a second air supply mode, and a third air supply mode. In the first air supply mode, flow control assembly 90 enables air to be channeled from air suction assembly 86 to air discharge assembly 88. In the second air supply mode, flow control assembly 90 channels a portion of air from air suction assembly 86 to air discharge assembly 88 and a portion of air to hub cavity 84, such that a volume of air discharged into boundary layer 56 from air discharge assembly 88 is less than a volume of air drawn in from boundary layer 56 by air suction assembly 86. In the third air supply mode, flow control assembly 90 enables air to be channeled from air suction assembly 86 to air discharge assembly 88, and channels additional air from hub 26 to air discharge assembly 88. In the third air supply mode, a volume of air discharged into boundary layer 56 from air discharge assembly 88 is greater than the volume of air drawn in from boundary layer 56 by air suction assembly 86.

Figure 6:
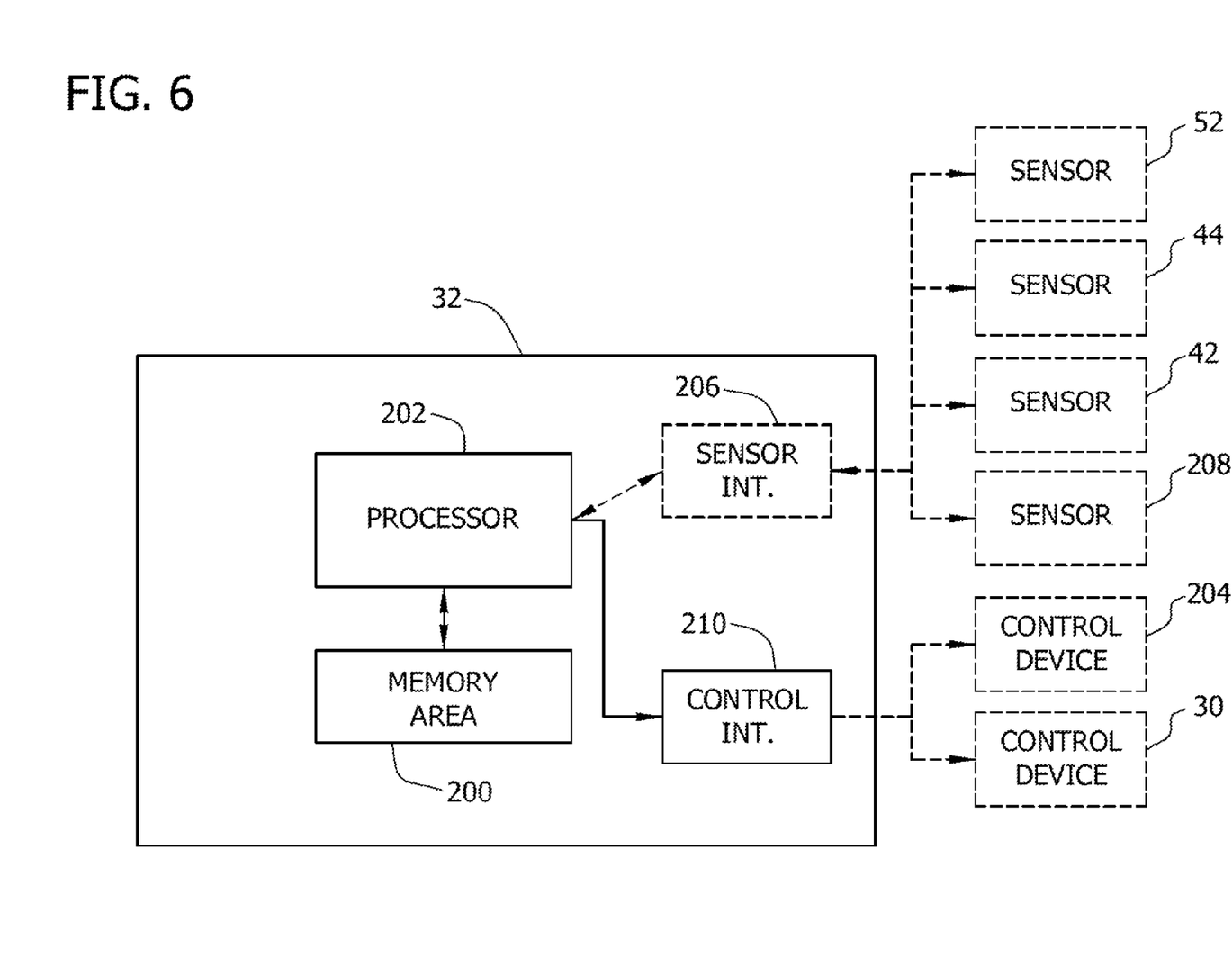
FIG. 6 is a block diagram of an exemplary control system suitable for use with the wind turbine shown in FIG. 1.

FIG. 6 is a block diagram illustrating an exemplary operational control system 32. In the exemplary embodiment, operational control system 32 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, operational control system 32 may be a microprocessor that includes read-only memory (ROM) and/or random access memory (RAM), such as, for example, a 32 bit microcomputer with 2 Mbit ROM and 64 Kbit RAM. As used herein, the term "real-time" refers to outcomes occurring at a substantially short period of time after a change in the inputs affect the outcome, with the time period being a design parameter that may be selected based on the importance of the outcome and/or the capability of the system processing the inputs to generate the outcome.

In the exemplary embodiment, operational control system 32 includes a memory area 200 configured to store executable instructions and/or one or more operating parameters representing and/or indicating an operating condition of wind turbine 10. Operating parameters may represent and/or indicate, without limitation, a speed of rotation, a pitch angle, a wind speed, and/or a wind direction. Operational control system 32 further includes a processor 202 that is coupled to memory area 200 and is programmed to determine an operation of one or more wind turbine control devices 204, for example, AFC system 30, based at least in part on one or more operating parameters. In one embodiment, processor 202 may include a processing unit, such as, without limitation, an integrated circuit (IC), an application specific integrated circuit (ASIC), a microcomputer, a programmable logic controller (PLC), and/or any other programmable circuit. Alternatively, processor 202 may include multiple processing units (e.g., in a multi-core configuration).

In the exemplary embodiment, operational control system 32 includes a sensor interface 206 that is coupled to at least one sensor 208 such as, for example, velocity sensors 42 and 52, and/or pitch sensor 44 for receiving one or more signals from sensor 208. Each sensor 208 generates and transmits a signal corresponding to an operating parameter of wind turbine 10. Moreover, each sensor 208 may transmit a signal continuously, periodically, or only once, for example, though other signal timings are also contemplated. Furthermore, each sensor 208 may transmit a signal either in an analog form or in a digital form. Operational control system 32 processes the signal(s) by processor 202 to create one or more operating parameters. In some embodiments, processor 202 is programmed (e.g., with executable instructions in memory area 200) to sample a signal produced by sensor 208. For example, processor 202 may receive a continuous signal from sensor 208 and, in response, periodically (e.g., once every five seconds) calculate an operation mode of AFC system 30 based on the continuous signal. In some embodiments, processor 202 normalizes a signal received from sensor 208. For example, sensor 208 may produce an analog signal with a parameter (e.g., voltage) that is directly proportional to an operating parameter value. Processor 202 may be programmed to convert the analog signal to the operating parameter. In one embodiment, sensor interface 206 includes an analog-to-digital converter that converts an analog voltage signal generated by sensor 208 to a multi-bit digital signal usable by operational control system 32.

Operational control system 32 also includes a control interface 210 that is configured to control an operation of AFC system 30. In some embodiments, control interface 210 is operatively coupled to one or more wind turbine control devices 204, for example, flow control assembly 90 (shown in FIG. 2).

Various connections are available between control interface 210 and control devices 204 and between sensor interface 206 and sensor 208. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside wind turbine 10) network connection, whether wired or wireless.

In the exemplary embodiment, operational control system 32 receives from sensor 208 signals indicative of a velocity of wind and receives from sensor 208 signals indicative of a pitch angle of rotor blade 28. Operational control system 32 is configured to calculate an aerodynamic efficiency of rotor blade 28 based on a velocity of wind and the pitch angle of rotor blade 28. Upon determining that the aerodynamic efficiency of rotor blade 28 is different than a predefined aerodynamic efficiency, operational control system 32 is configured to operate AFC system 30 in lift increasing mode. In one embodiment, operational control system 32 is configured to receive from sensor 208 signals indicative of a rotational speed of rotor 22. In this embodiment, operational control system 32 is configured to operate AFC system 30 in lift increasing mode when the sensed rotational speed is less than a predefined rotational speed. Operational control system 32 is further configured to operate AFC system 30 in lift decreasing mode when the sensed rotational speed is greater than a predefined rotational speed.

Figure 7:
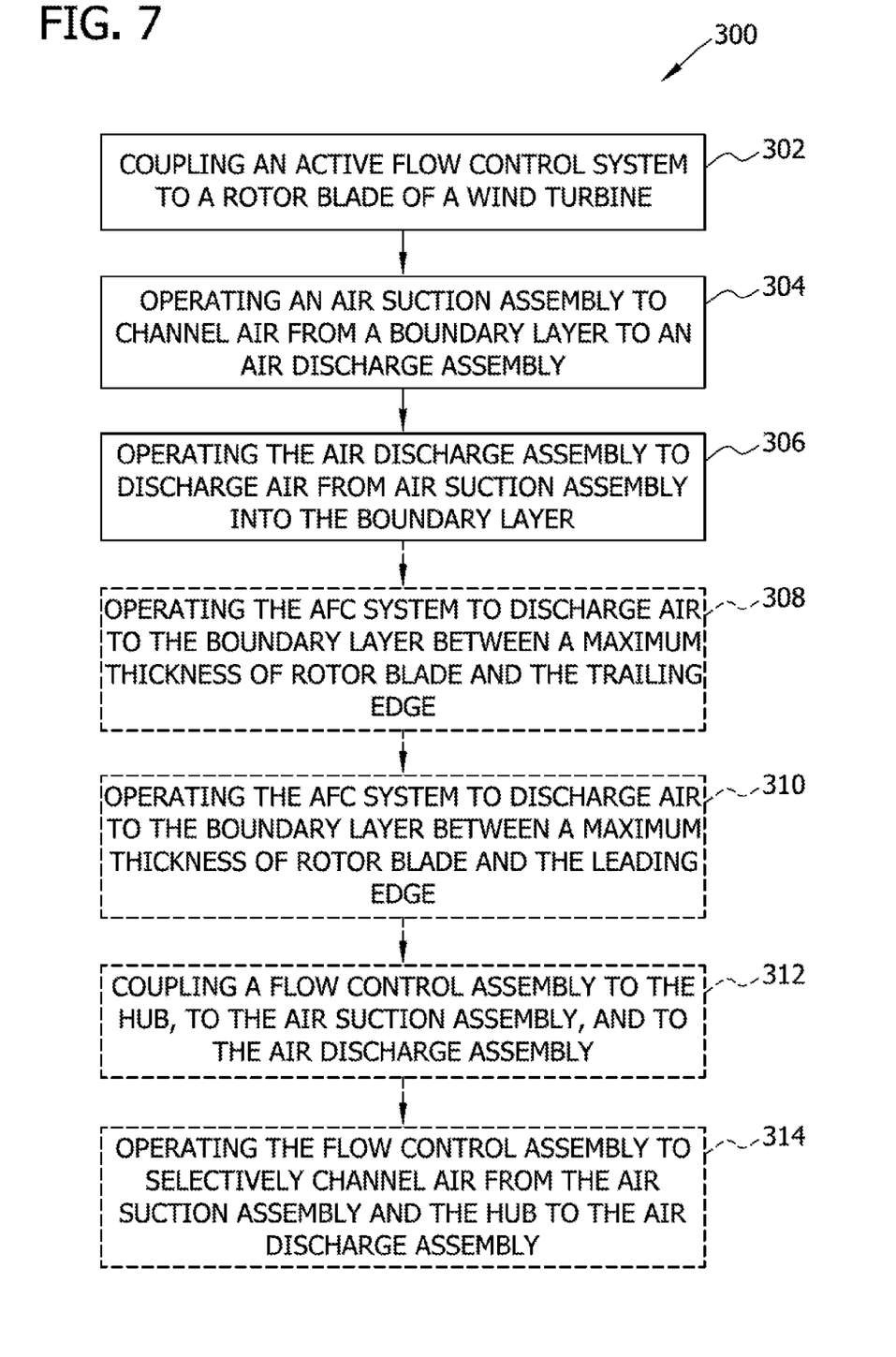
FIG. 7 is a flow chart illustrating an exemplary method of manipulating a boundary layer across the rotor blade shown in FIG. 2.

FIG. 7 is a flow chart illustrating an exemplary method 300 of manipulating boundary layer 56 across rotor blade 28. In the exemplary embodiment, method 300 includes coupling 302 AFC system 30 to rotor blade 28. Air suction assembly 86 is operated 304 to channel air from boundary layer 56 air discharge assembly 88. Air discharge assembly 88 is operated 306 to discharge air from air suction assembly 86 into boundary layer 56. In one embodiment, method 300 also includes operating 308 AFC system 30 in the first operational mode to discharge air to the boundary layer at a location between a maximum thickness of the rotor blade along the chordwise axis and the trailing edge. AFC system 30 is operated 310 in the second operational mode to discharge air to the boundary layer at the location between a maximum thickness of the rotor blade along the chordwise axis and the leading edge. In another alternative embodiment, method 300 includes coupling 312 flow control assembly 90 to hub 26, to air suction assembly 86, and to air discharge assembly 88, and operating 314 flow control assembly 90 to selectively channel air from air suction assembly 86 and hub 26 to air discharge assembly 88.

An exemplary technical effect of the system, method, and apparatus described herein includes at least one of: (a) transmitting, from a sensor to a control system, at least a first monitoring signal indicative of a velocity of wind; (b) transmitting at least a second signal indicative of a pitch of a rotor blade; (c) calculating, by the control system, an aerodynamic efficiency of the rotor blade based on the first signal and the second signal; (d) comparing the calculated aerodynamic efficiency to a predefined aerodynamic efficiency; and (e) operating an active flow control system when the calculated aerodynamic efficient is different than the predefined aerodynamic efficiency.

The above-described system, method, and apparatus facilitate manipulating a boundary layer across a rotor blade of a wind turbine to increase an aerodynamic efficiency of the rotor blade during operation of the wind turbine. More specifically, the active flow control system is configured to draw air from the boundary layer and to selectively discharge air into the boundary layer. By drawing air from the boundary layer and discharging air into the boundary layer, the active flow control system facilitates increasing the aerodynamic efficiency of the rotor blade during operation of the wind turbine, and reduces the power requirements of wind turbine components as compared to known wind turbines. As such, the annual energy production of the wind turbine can be increased.

Exemplary embodiments of systems and methods for manipulating a boundary layer are described above in detail. The systems and methods are not limited to the specific embodiments described herein, but rather, components of the systems and/or steps of the methods may be utilized independently and separately from other components and/or steps described herein. For example, the methods may also be used in combination with other active flow control systems, and are not limited to practice with only the wind turbine systems as described herein. Rather, the exemplary embodiment can be implemented and utilized in connection with many other blade lift enhancement applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An active flow control system for manipulating a boundary layer of air across a wind turbine rotor blade, the wind turbine rotor blade having at least one sidewall defining a cavity therein, the sidewall extending between a leading edge and an axially spaced trailing edge, wherein the wind turbine rotor blade has a chordwise axis defined between the leading edge and the trailing edge, and a thickness defined perpendicularly from the chordwise axis, said active flow control system comprising:
    an air discharge assembly coupled to the sidewall, said air discharge assembly configured to selectively discharge air from within the wind turbine rotor blade into the boundary layer; and,
    an air suction assembly coupled to the sidewall and to said air discharge assembly, said air suction assembly configured to channel air from the boundary layer to said air discharge assembly, said air suction assembly comprising a plurality of suction apertures defined through the sidewall, said plurality of suction apertures positioned between the trailing edge and a location of a maximum thickness of the wind turbine rotor blade with respect to the chordwise axis.

2. An active flow control system in accordance with claim 1, further comprising a flow control assembly coupled between said air discharge assembly and said air suction assembly, said flow control assembly configured to selectively channel air from said air suction assembly to said air discharge assembly.

3. An active flow control system in accordance with claim 2, wherein the wind turbine rotor blade is coupled to a hub defining a cavity, and said flow control assembly is coupled to the hub for selectively channeling air between the hub cavity, said air suction assembly, and said air discharge assembly.

4. An active flow control system in accordance with claim 1, wherein said air discharge assembly comprises:
    a first discharge manifold positioned at least partially within the cavity of the wind turbine rotor blade, said first discharge manifold coupled to said air suction assembly; and,
    a plurality of first discharge apertures defined through the sidewall and providing flow communication between ambient air and said first discharge manifold, said plurality of first discharge apertures positioned between said plurality of suction apertures and the trailing edge.

5. An active flow control system in accordance with claim 4, wherein said air discharge assembly further comprises:

a second discharge manifold positioned at least partially within the cavity of the wind turbine rotor blade, said second discharge manifold coupled to said air suction assembly; and, a plurality of second discharge apertures defined through the sidewall, and providing flow communication between ambient air and said second discharge manifold, said plurality of second discharge apertures positioned between the leading edge and the location of maximum thickness of the wind turbine rotor blade with respect to the chordwise axis.

6. An active flow control system in accordance with claim 4, wherein the wind turbine rotor blade has a spanwise axis defined between a root portion and a tip portion, said plurality of suction apertures defined at a first spanwise distance from tip portion, said plurality of first discharge apertures defined at a second spanwise distance from tip portion that is different than the first spanwise distance.

7. An active flow control system in accordance with claim 4, wherein the wind turbine rotor blade has a spanwise axis defined between a root portion and a tip portion, said plurality of suction apertures defined at a first spanwise distance from tip portion, said plurality of first discharge apertures defined at a second spanwise distance from tip portion that is equal to the first spanwise distance.

8. A wind turbine, comprising:
a tower;
a nacelle coupled to said tower;
a hub rotatably coupled to said nacelle, said hub defining a cavity;
at least one rotor blade coupled to said hub, said rotor blade comprising at least one sidewall defining a cavity, said sidewall having an outer surface extending between a leading edge and an axially-spaced trailing edge of said rotor blade, wherein said rotor blade has a chordwise axis defined between the leading edge and the trailing edge, and a thickness defined perpendicularly from the chordwise axis; and,
an active flow control system coupled to said rotor blade for manipulating a boundary layer of air across said outer surface, said active flow control system comprising:
an air discharge assembly coupled to said sidewall, said air discharge assembly configured to selectively discharge air into the boundary layer; and,
an air suction assembly coupled to said sidewall and to said air discharge assembly, said air suction assembly configured to channel air from the boundary layer to said air discharge assembly, said air suction assembly comprising a plurality of suction apertures defined through said sidewall, said plurality of suction apertures positioned between the trailing edge and a location of a maximum thickness of said rotor blade along the chordwise axis.

9. A wind turbine in accordance with claim 8, further comprising a flow control assembly coupled between said air discharge assembly and said air suction assembly, said flow control assembly configured to selectively channel air from said air suction assembly to said air discharge assembly.

10. A wind turbine in accordance with claim 9, wherein said flow control assembly is coupled to said hub for selectively channeling air between said hub cavity, said air suction assembly, and said air discharge assembly.

11. A wind turbine in accordance with claim 8, wherein said air discharge assembly comprises:
a first discharge manifold positioned at least partially within said cavity of said rotor blade, said first discharge manifold coupled to said air suction assembly; and,
a plurality of first discharge apertures defined through said sidewall providing flow communication between ambient air and said first discharge manifold, said plurality of first discharge apertures positioned between said plurality of suction apertures and the trailing edge.

12. A wind turbine in accordance with claim 11, wherein said air discharge assembly further comprises:
a second discharge manifold positioned at least partially within said cavity of said rotor blade, said second discharge manifold coupled to said air suction assembly; and,
a plurality of second discharge apertures defined through said sidewall providing flow communication between ambient air and said second discharge manifold, said plurality of second discharge apertures positioned between the leading edge and the location of maximum thickness of said rotor blade along chordwise axis.

13. A method of manipulating a boundary layer across a wind turbine rotor blade, wherein the wind turbine rotor blade includes a leading edge, a trailing edge, and a sidewall extending along a chordwise axis between the leading edge and the trailing edge, said method comprising:
coupling an active flow control system to the rotor blade, the active flow control system including an air suction assembly and an air discharge assembly, each of the air suction assembly and the air discharge assembly in flow communication with the boundary layer;
operating the air suction assembly to channel air from the boundary layer to the air discharge assembly, wherein the air suction assembly includes a plurality of suction apertures defined through the sidewall, the plurality of suction apertures positioned between the trailing edge and a location of a maximum thickness of the rotor blade along the chordwise axis; and,
operating the air discharge assembly to discharge air from the air suction assembly into the boundary layer.

14. A method in accordance with claim 13, further comprising operating the active flow control system in one of a plurality of operational modes, the active flow control system discharging air to the boundary layer to facilitate increasing a lift across the rotor blade in a first operational mode of the plurality of operational modes, and the active flow control system discharging air to the boundary layer to facilitate decreasing a lift across the rotor blade in a second operational mode of the plurality of operational modes.

15. A method in accordance with claim 14, further comprising operating the active flow control system in the first operational mode to discharge air to the boundary layer at a location between a maximum thickness of the rotor blade along the chordwise axis and the trailing edge.

16. A method in accordance with claim 15, further comprising operating the active flow control system in the second operational mode to discharge air to the boundary layer at the location between a maximum thickness of the rotor blade along the chordwise axis and the leading edge.

17. A method in accordance with claim 13, wherein the rotor blade is coupled to a hub, said method further comprising:
coupling a flow control assembly to the hub, the air suction assembly, and the air discharge assembly; and,
operating the flow control assembly to selectively channel air from the air suction assembly and the hub to the air discharge assembly.

18. A method in accordance with claim 17, further comprising operating the flow control assembly in one of a plurality of operational modes, the flow control assembly channeling air from the air suction assembly to the air discharge assembly and channeling air from the hub to the air discharge assembly in a first operational mode of the plurality of operational modes, and the flow control assembly channeling a first portion of air from the air suction assembly to the air discharge assembly and channeling a second portion of air from the air suction assembly to the hub in a second operational mode of the plurality of operational modes.

* * * * *